JUDEVINE & SHAW.
Grain Binder.
No. 39,234. Patented July 14, 1863.
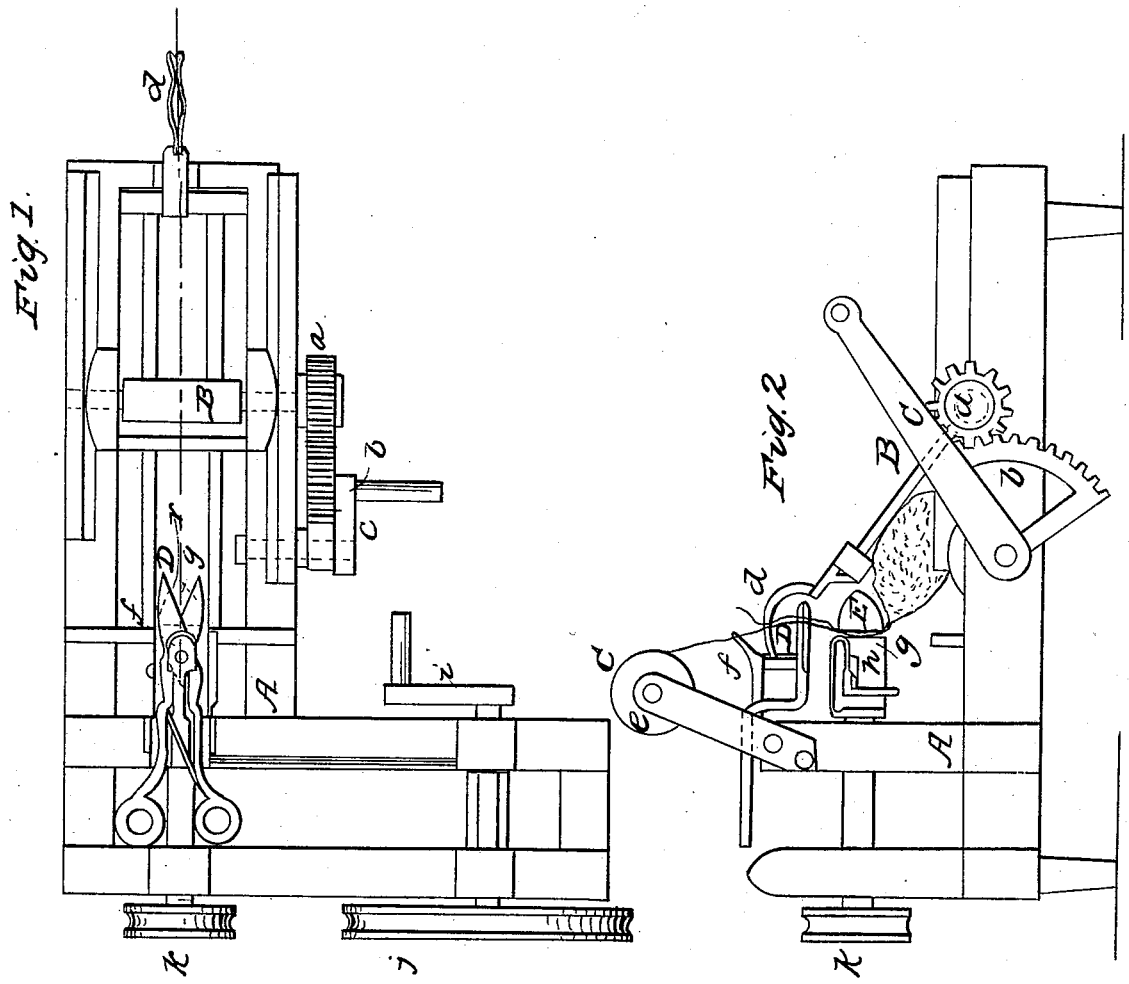

UNITED STATES PATENT OFFICE.

JOSIAH JUDEVINE AND ZEBULON SHAW, OF ROXBURY, WISCONSIN.

IMPROVEMENT IN GRAIN-BINDERS.

Specification forming part of Letters Patent No. 39,234, dated July 14, 1863.

*To all whom it may concern:*

Be it known that we, JOSIAH JUDEVINE and ZEBULON SHAW, both of Roxbury, in the county of Dane and State of Wisconsin, have invented a new and Improved Grain-Binder; and we do hereby declare that the following is a full, clear, and exact description of the same, reference being had to the accompanying drawing, forming a part of this specification, in which—

Figure 1 represents a plan or top view of our invention, partly in section. Fig. 2 is a sectional side elevation of the same.

Similar letters of reference in both views indicate corresponding parts.

The object of this invention is to produce a grain-binder which will enable two men to complete the binding of the grain as fast as the reaper will cut, one man being required to take the grain from the platform of the reaper to the gatherer of the grain-binder, and the other to operate the different parts of the binder.

To enable those skilled in the art to make and use our invention, we will proceed to describe it.

A represents a frame made of timber or any other suitable material of sufficient strength to support the working parts of our grain-binder. This frame is intended to be set upon the platform of a reaper, and it forms the bearings for the oscillating part of the gatherer B. The stationary part of the gatherer forms a platform to receive the grain, and the oscillating part is provided with gudgeons, one of which extends beyond the side of the frame A to receive the pinion $a$. This pinion gears in a segmental cog-wheel, $b$, to which an oscillating motion is imparted by a crank, $c$. By these means the oscillating part of the gatherer can be turned up whenever a sufficient quantity of grain has been thrown on the stationary part to make up a sheaf.

The movable part of the gatherer is provided with two spring-jaws, $d$, which serve to hold the twine and to carry the end down after a sheaf has been finished and the twine cut. The twine is wound on a spool, C, which runs on a horizontal spindle, $e$ that has its bearings in two standards rising from the frame A. From the spool the twine is drawn through a loop, $f$, and thence down to the gatherer and to the spring-jaws $d$.

D is a pair of scissors which are situated under the loop $f$ and spool C, and over the twisting mechanism E.

This mechanism consists of a spring-clamp, $g$, inserted into a head, $h$, to which an intermittent rotary motion is imparted by the crank $i$ and pulleys $j$ $k$.

The operation is as follows: When a sufficient quantity of grain for one sheaf has been thrown on the gatherer and on the twine extending over the whole length of the same, the movable part of the gatherer is turned up by the crank $c$, segmental cog-wheel $b$, and pinion $a$. The twine is then secured by the spring-clamp $g$, and by giving to said clamp several revolutions the operation of twisting is performed. As soon as this operation has been accomplished the twine is cut off by the scissors D, and the sheaf is removed from the gatherer. In turning back the movable part of the gatherer, the spring-jaws $d$ carry out the end of the twine, and the binder is ready for a new operation.

What we claim as new, and desire to secure by Letters Patent, is—

The arrangement of the gatherer B, with spring-jaws $d$, pinion $a$, segmental cog-wheel $b$, and crank $c$, in combination with the spool C, scissors D, and twisting mechanism E, all constructed and operating in the manner and for the purpose substantially as herein shown and described.

JOSIAH JUDEVINE.
ZEBULON SHAW.

Witnesses:
ISAAC MOREHOUSE,
L. D. MILLER.